O. M. GARRISON.
FRUIT PICKER.
APPLICATION FILED JAN. 13, 1915.
1,166,586.
Patented Jan. 4, 1916.
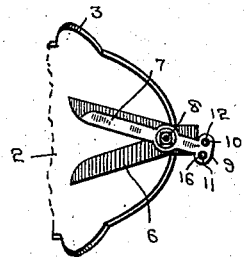
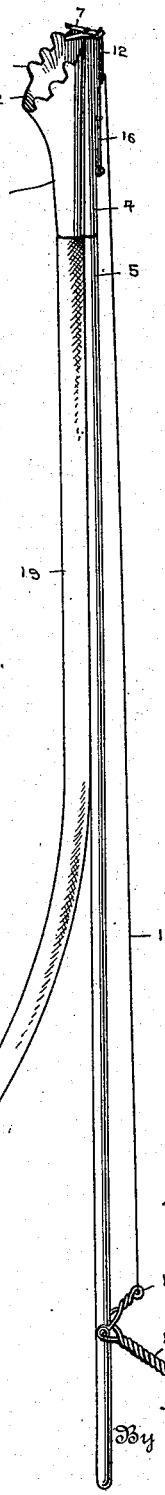
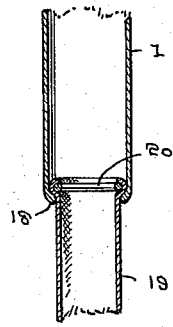
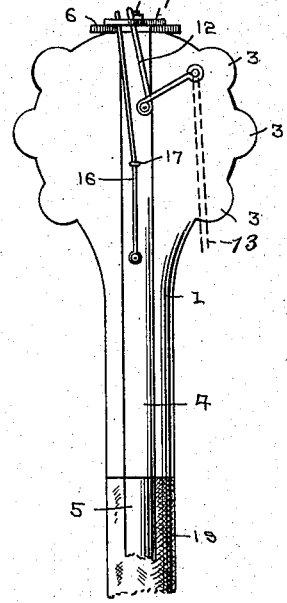
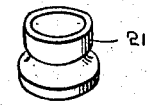
Witnesses
Inventor
O. M. Garrison
Attorney

UNITED STATES PATENT OFFICE.

OBADIAH M. GARRISON, OF LUTESVILLE, MISSOURI.

FRUIT-PICKER.

1,166,586.  Specification of Letters Patent.  Patented Jan. 4, 1916.

Application filed January 13, 1915. Serial No. 2,013.

*To all whom it may concern:*

Be it known that I, OBADIAH M. GARRISON, a citizen of the United States, residing at Lutesville, in the county of Bollinger and State of Missouri, have invented certain new and useful Improvements in Fruit-Pickers; and I do hereby declare the following to be a full, clear, and exact description of the invention, such as will enable others skilled in the art to which it appertains to make and use the same.

My invention relates to new and useful improvements in fruit pickers, and my object is to provide means for removing the fruit from the tree without the use of a ladder or other means of gaining access to the upper portion of the tree.

A further object is to provide means for severing the stem of the fruit from the limb of the tree so that the fruit may be gathered without bruising the same. And a further object is to provide means for conveying the friut so picked into a suitable receptacle.

Other objects and advantages will be hereinafter more clearly pointed out in the accompanying specification.

In the accompanying drawings, which are made a part of this application, Figure 1 is a perspective view of the fruit picker ready for use, Fig. 2 is a fragmentary top plan view thereof, Fig. 3 is a detail elevation of the rear portion of the picker, Fig. 4 is an enlarged detail sectional view showing the manner of attaching a tube to parts of the picker, and, Fig. 5 is a perspective view of a cap used in connection with the picker.

Referring to the drawings, in which similar reference numerals designate corresponding parts throughout the several views, 1 indicates the body portion of the picker which is tubular, and has its upper end 2 flared or notched and the edge thereof disposed at an angle to the axial center of the body, the edge of the flared end having projections 3 thereon which projections are adapted, when necessary, to engage the fruit and move the stems thereof into position to be severed. Preferably formed integrally with the rear face of the body 1 is a socket 4 adapted to receive the upper end of a staff 5 by means of which the picker is directed into engagement with the fruit, said staff being of sufficient length that the picker may be engaged with the fruit at the top of the tree without requiring the use of a ladder. Mounted at the upper end of the body portion and over the socket 4 is a stationary blade 6, with which is adapted to coöperate a movable blade 7, said movable blade being secured to the stationary blade by means of a bolt or the like 8.

One end of the blade 7 is provided with a head 9 in which are formed apertures 10 and 11, one arm of a bell-crank lever 12 being introduced through the aperture 10, and said lever being pivotally attached to the wall of the socket 4. Connected to the opposite arm of the bell-crank lever 12 is a cable 13, said cable being extended lengthwise of the staff 5 and secured to an arm 14 of an operating lever 15, said lever being pivotally secured to the staff adjacent its lower end, and it will be readily seen that when the lever 15 is lowered, the bell-crank lever 12 will be rocked on its pivot and the cutting edge of the blade 7 moved toward the cutting edge of the blade 6, said blades severing the stems of the fruit interposed between the two. In order to return the blade 7 to its initial open position and normally retain the same separated from the blade 6, a spring 16 is attached at one end to the socket 4, the opposite end thereof extending through the aperture 11, said spring also passing through an eye 17 attached to the socket 4 between the pivotal point of the spring 16 and the end thereof extending through the opening 11, the tension of the spring being such as to normally open the blade 7 when the lever 15 is released.

The lower end of the body 1 is preferably rolled into a bead 18, said bead being positioned on the inner surface of the body so that when the tube 19 is employed for conveying the fruit from the body to any suitable receptacle, the end of the tube may be impinged against said bead by the introduction of the ring 20 into the upper end of the tube, said ring being of such diameter as to extend into the path of the bead and rest thereon thus securely locking the end of the tube in engagement with the body.

The tube 19 may be constructed of any suitable material, preferably fabric, and is designed to convey the fruit from the picker to a bag or other receptacle carried by the operator. It can readily be seen that when the stem of the fruit is severed through the medium of the cutting blade, said fruit will descend into the body and thence through the tube to the desired point.

In securing the tube to the body of the picker, the ring 20 is forced into the end of the tube and the tube then introduced through the upper end of the body and moved therethrough until the ring engages the bead 18, and as the ring is of slightly greater diameter than the tube, it will overhang said bead and prevent further descent of the tube.

In case it is not desired to have the fruit descend through the tube, said tube is removed and the lower end of the body is closed by means of a cap 21 so that when cherries, peaches or the like are being gathered a sufficient number are severed from the tree to fill the body when the body is lowered and the fruit emptied therefrom and this may also apply to the picking of apples, one apple being handled at a time. The body 1 is preferably constructed of tin or other sheet metal and the socket may be formed integrally therewith or made separately and attached thereto, and by providing the projections 3 at the engaging end of the body, said projections may be moved into engagement with the fruit so that the fruit will be brought into position for engagement with the cutting blades so that by operating the lever and its coöperating parts the stem holding the fruit may be severed and the fruit permitted to descend into the body portion. This form of picker can be very cheaply constructed and at the same time rendered very strong and durable.

In operation, the body 1 is elevated and the end 2 thereof disposed around the fruit to be gathered. Then the cutting blades are moved until they rest upon opposite sides of the stem sustaining the fruit, when by operating the lever 15 the cutting blades will be operated and the stem of the fruit severed, the fruit descending into the body or through the body into the tube 19 and thence into any suitable receptacle. In view of the fact that the tube is formed of flexible material, the fruit will not be injured in its descent.

In addition to employing the device for picking apples, it may be employed for picking various kinds of fruit such as peaches, cherries and the like, and will be as readily adapted for this purpose as for gathering apples.

What I claim is:

1. A fruit picker comprising a hollow body portion having a flared upper end the edge wall of which is inclined, said edge wall having a plurality of projections thereon to guide the fruit into said flared end, a staff engaged with and supporting said body portion, an interiorly extending bead at the lower end of said body, a tube extending into said body, and a ring the outer circumference of which is greater than the inner circumference of said bead adapted to be introduced into the end of the tube and impinge the tube against said bead and hold the tube in engagement with the body.

2. A fruit picker comprising a hollow body portion having a flared inclined upper end, a plurality of spaced projections integral with the upper edge of the body, a socket carried by the body, a staff engaged with said socket, a stationary blade projecting over the upper end of the body, a movable blade pivoted thereto, a bell-crank lever pivoted to the socket and having one of its arms engaged with the end of the movable blade, a cable attached to the opposite arm of said bell-crank lever, a lever pivoted to said staff, an arm fixed to said lever to which the lower end of said cable is attached, whereby when the lever is rocked on its pivot the movable blade will be moved into engagement with the fixed blade to sever an object between the blades, a spring having one of its ends attached to said socket and its free end engaged with the movable blade to return said movable blade to its open position and an eye on said socket surrounding said spring between its ends.

In testimony whereof I have signed my name to this specification in the presence of two subscribing witnesses.

OBADIAH M. GARRISON.

Witnesses:
  G. H. ARTHUR,
  E. M. CALDWELL.

Copies of this patent may be obtained for five cents each, by addressing the "Commissioner of Patents, Washington, D. C."